(12) United States Patent
Wu

(10) Patent No.: US 9,550,329 B1
(45) Date of Patent: Jan. 24, 2017

(54) UNIVERSAL LOADING STATION FOR LASER 3D PRINTER

(71) Applicant: Jiangsu Rich-Opto Technology Co., Ltd., Zhenjiang, Jiangsu (CN)

(72) Inventor: Yin Wu, Zhenjiang (CN)

(73) Assignee: Jiangsu Rich-Opto Technology Co., Ltd., Zhenjiang (CN)

( * ) Notice: Subject to any disclaimer, the term of this patent is extended or adjusted under 35 U.S.C. 154(b) by 0 days.

(21) Appl. No.: 15/227,218

(22) Filed: Aug. 3, 2016

(30) Foreign Application Priority Data

May 13, 2016 (CN) .......................... 2016 1 0319949

(51) Int. Cl.
*B25J 17/02* (2006.01)
*B29C 67/00* (2006.01)
*B33Y 30/00* (2015.01)

(52) U.S. Cl.
CPC ........ *B29C 67/0092* (2013.01); *B25J 17/0208* (2013.01); *B25J 17/0233* (2013.01); *B33Y 30/00* (2014.12)

(58) Field of Classification Search
CPC ........................... B29C 67/0092; Y10S 901/45
USPC .......... 74/490.05, 490.06; 277/504; 403/114, 403/129, 138, 225, 226; 414/14, 18, 214, 395, 414/400, 585; 901/45
See application file for complete search history.

(56) References Cited

U.S. PATENT DOCUMENTS

| | | | | |
|---|---|---|---|---|
| 1,294,583 A * | 2/1919 | Whisler | ................. | F16D 3/221 403/114 |
| 2,009,401 A * | 7/1935 | Hufferd | ............... | F16C 11/0604 403/138 |
| 2,065,589 A * | 12/1936 | Hufferd | ............... | F16C 11/0604 403/127 |
| 2,108,814 A * | 2/1938 | Flumerfelt | .......... | F16C 11/0609 403/129 |
| 2,110,148 A * | 3/1938 | Gross | .................. | F16C 11/0609 403/129 |
| 2,118,990 A * | 5/1938 | Todd | ...................... | A01D 34/33 403/138 |
| 2,122,655 A * | 7/1938 | Niles | .................... | F16C 11/0604 403/127 |
| 2,124,034 A * | 7/1938 | Hufferd | ................. | B60G 7/005 403/129 |
| 4,092,078 A * | 5/1978 | Klotz | ....................... | B62D 7/16 280/93.511 |

(Continued)

FOREIGN PATENT DOCUMENTS

CN           104228069 A    12/2014

*Primary Examiner* — Michael McCullough
*Assistant Examiner* — Brendan Tighe
(74) *Attorney, Agent, or Firm* — Feng Shan; SZDC Law P.C.

(57) ABSTRACT

A universal loading station for a 3D printer includes a knob, a ball screw, a telescopic connecting ring, a telescopic connecting rod, and a loading plate. The top of the ball screw ball screw and the bottom of the knob are connected by a threaded connection. The ball screw is below the knob and includes an outer sleeve which includes a spring. A fixed connection sleeve surrounds the outer sleeve of the spring. A connecting arm is connected to a side of the fixed connection sleeve. The bottom of the ball screw is connected to the telescopic connecting ring. The bottom of the telescopic connecting ring includes a first hemispherical recess, and the center of the first hemispherical recess includes a first hole. The telescopic connecting ring is placed onto the ball screw through the first hole.

5 Claims, 3 Drawing Sheets

(56) References Cited

U.S. PATENT DOCUMENTS

| | | | | |
|---|---|---|---|---|
| 5,092,703 | A | * | 3/1992 | Kobayashi .............. B29C 45/14 403/122 |
| 5,566,926 | A | * | 10/1996 | Voigt .................. E01F 15/0461 256/13.1 |
| 2015/0232016 | A1 | * | 8/2015 | Burton ................... B60Q 1/068 403/138 |

* cited by examiner

UNIVERSAL LOADING STATION FOR LASER 3D PRINTER

The present application claims the benefit of Chinese Application No. 201610319949.7, filed on May 13, 2016, which is incorporated by reference for all purposes as if fully set forth herein.

TECHNICAL FIELD

The present invention relates to the field of three dimensional (3D) printing, particularly to a universal loading station for a laser 3D printer.

BACKGROUND 3D printing is a technology based on mathematical model files, using adhesive materials, such as special wax, powdered metal or plastic materials, applying a layer-by-layer printing method to construct an object. It is different from a traditional material construction method, and is a new three dimensional layer-by-layer printing method via gradually adding materials. With the rapid development of 3D printing technology, laser technology, due to its speed and accuracy, has been widely applied to 3D printing as the source of energy. Specifically, photosensitive resin stereolithography apparatus (SLA) has dominated the market. SLA uses the principle of three dimensional sculpture, a resin tank is filled with liquid photosensitive resin, and the photosensitive resin is cured after a fast UV laser irradiation to directly obtain a cured resin or similar plastic product.

The design and optimization of the optical system of a laser 3D printer directly affects the printing precision, speed, and stability. For example, CN104228068A discloses a rapid SLA 3D printer and a printing method using thereof. In this 3D printer, a lifting station above a vertical slot can only move up and down, and the angle of the lifting station cannot be adjusted automatically based on the changes of the angle of the resin surface in a resin tank. Thus, when the resin surface angle in the resin tank is an inclined angle, the lifting station and the resin surface will not have a good fit. To achieve optimized printing results, workers will manually adjust the angle of the lifting station after printing one layer based on the inclined angle of the resin surface. It not only is time consuming, but also affects printing quality, not meeting printing precision, speed, and, and product stability requirements. Especially for high-end applications, such as modeling jewelry, dental tooth mold, prototype models, the printing needs cannot be met.

SUMMARY OF THE INVENTION

Technical problem to be solved by the present invention is to provide a simple and easy to operate universal loading station for a laser 3D printer with high printing quality.

A universal loading station for a 3D printer includes a knob, a ball screw, a telescopic connecting ring, a telescopic connecting rod, and a loading plate. The top of the ball screw ball screw and the bottom of the knob are connected by a threaded connection. The ball screw is below the knob and includes an outer sleeve which includes a spring. A fixed connection sleeve surrounds the outer sleeve of the spring. A connecting arm is connected to a side of the fixed connection sleeve. The bottom of the ball screw is connected to the telescopic connecting ring. The bottom of the telescopic connecting ring includes a first hemispherical recess, and the center of the first hemispherical recess includes a first hole. The telescopic connecting ring is placed onto the ball screw through the first hole. The bottom of the ball screw has a hemispherical structure that matches the inner wall of the first hemispherical recess. There is space between the inner wall of the first hole and the ball screw. The telescopic connecting ring is connected to the top of the telescopic connecting rod, and the bottom of the telescopic connecting rod is connected to the top surface of the loading plate.

The universal loading station can also include a top plate. The top plate is provided on the top of the fixed connection sleeve. The top of the fixed connection sleeve and the top plate are connected by screws at the edge of the top plate. The top plate includes a ninth hole in the center thereof, and the top plate is placed onto the ball screw 8 through the ninth hole.

The universal loading station can also include a protective cover. The protective cover is located between the telescopic connecting rod and the loading plate. The protective cover includes a second hole in the center thereof. The bottom of the telescopic connecting rod is placed through the second hole. The side of the protective cover and the side of the telescopic connecting rod include a third hole and a fourth hole, respectively. The third hole and fourth hole overlay. A first locking screw is placed in the third hole and the fourth hole. The side of the protective cover includes a fifth hole. The fifth hole connects to the middle of the third hole. The first locking screw includes a sixth hole. The sixth hole and the fifth hole overlay. A second locking screw is placed in the sixth hole and the fifth hole. A second locking screw is placed in the fifth hole and the sixth hole. A locking pin connects the protective cover and the telescopic connecting rod.

In the universal loading station, the top of the telescopic connecting rod includes a stair shaped seventh hole. The protective cover includes a corresponding first blind hole. The locking pin is placed in the seventh hole and the first blind hole.

In the universal loading station, the loading plate is in a horizontal direction.

Compared with convention technology, the advantages of the universal loading station include: based on the pressure between the loading plate and the surface of the resin in the resin tank, the universal loading station can automatically adjust the tilt angle of the loading plate. It ensures that the bottom of the loading plate is full and firm contact. Tightening the locking screw and the knob locks the loading plate at a certain tilt angle so that the bottom of loading plate is always in full and firm contact with the surface of the resin in the whole 3D printing process. This eliminates the man power and time to manually adjust angle of the loading plate in printing process. Further, a second locking screw strengthens the first locking screw, and prevents the movement between the protective cover and the telescopic connecting rod. It also increases the stability of the loading plate. The universal loading station can be connected with a 3D printer lifting mechanism in various ways. It is easy to install and to adjust.

The following drawings and description will provide further explanation of the universal loading station for laser 3D printer as claimed.

DETAILED DESCRIPTION OF THE ILLUSTRATED EMBODIMENTS

Figure 1:
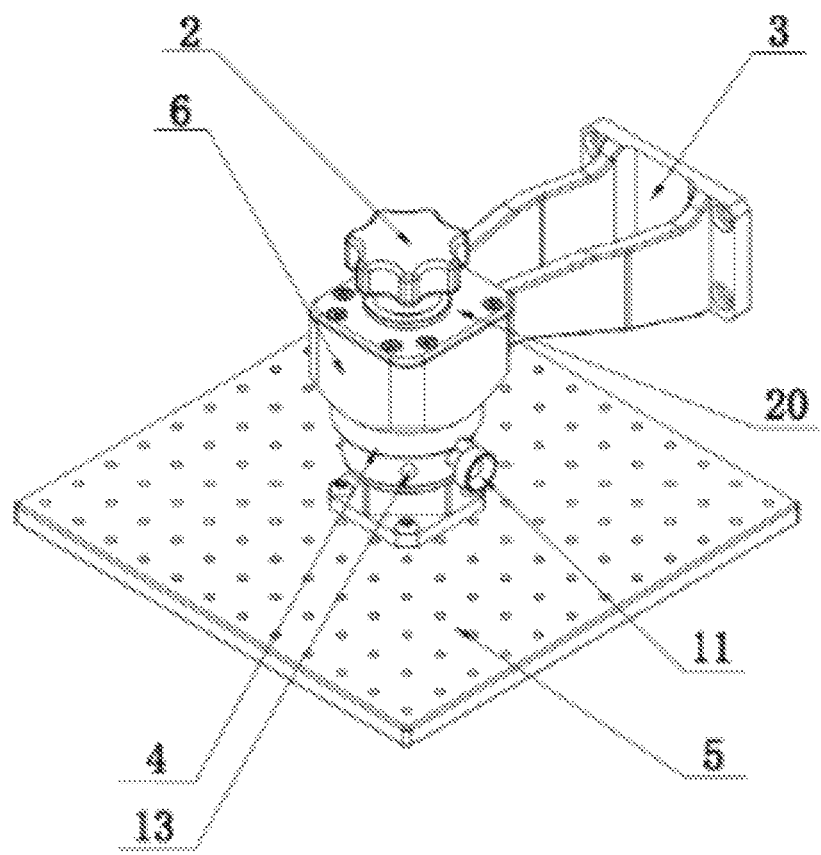
FIG. 1 shows a universal loading station of a laser 3D printer in a perspective view.
Figure 2:
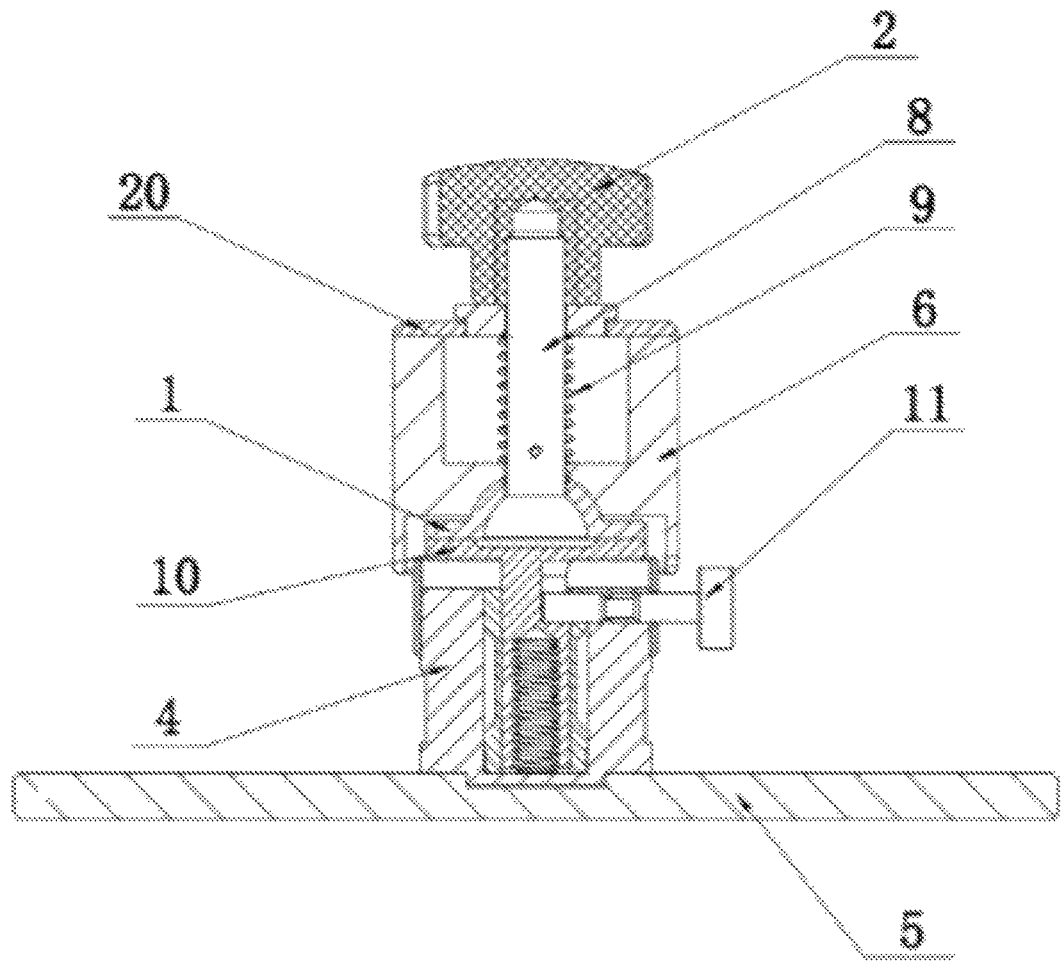
FIG. 2 shows a universal loading station of a laser 3D printer in a front cross-sectional view.
Figure 3:
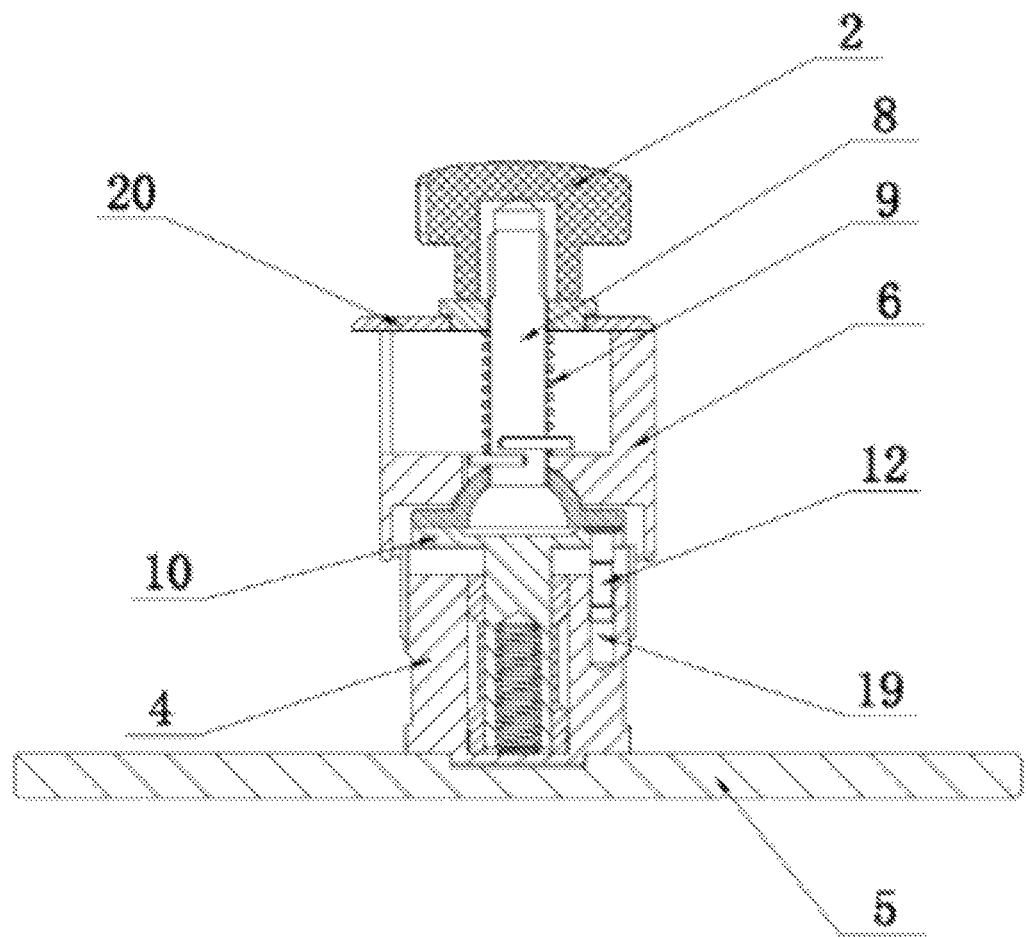
FIG. 3 shows a universal loading station of a laser 3D printer in a left cross-sectional view.

As shown in FIGS. 1, 2 and 3, a laser 3D printer with a universal loading station includes a knob 2, a ball screw 8, a telescopic connecting ring 1, a telescopic connecting rod 10, a protective cover 4 and a loading plate 5. The top of the ball screw ball screw 8 and the bottom of the knob 2 are connected by a threaded connection. The ball screw 8 is below the knob 2 and has an outer sleeve which includes a spring 9. A fixed connection sleeve 6 surrounds the outer sleeve of the spring 9. A top plate 20 is provided on the top of the fixed connection sleeve 6. The top of the fixed connection sleeve 6 and the top plate 20 are connected by screws at the edge of the top plate 20. The top plate 20 includes a ninth hole in the center. The top plate is placed onto the ball screw 8 through the ninth hole. A connecting arm 3 is connected to a side of the fixed connection sleeve 6. The universal loading station is connected to a lifting mechanism of the 3D printer via the connecting arm 3, and the universal loading station is fixed to the 3D printer. The bottom of the ball screw 8 is connected to the telescopic connecting ring 1. The bottom of the telescopic connecting ring 1 includes a first hemispherical recess, and the center of the first hemispherical recess includes a first hole. The telescopic connecting ring 1 is placed onto the ball screw 8 through the first hole. The bottom of the ball screw 8 has a hemispherical structure that matches the inner wall of the first hemispherical recess. There is some space between the inner wall of the first hole and the ball screw 8 so that the telescopic connecting ring 1 can move or swing around the hemispherical bottom of the ball screw 8 to a certain degree. The telescopic connecting ring 1 is connected to the top of the telescopic connecting rod 10 via bolts. The protective cover 4 includes a second hole in the center, and the telescopic connecting rod 10 is placed onto the protective cover 4 through the second hole. The side of the protective cover 4 and the side of the telescopic connecting rod 10 include a third hole and a fourth hole, respectively. The third hole and fourth hole overlay. A first locking screw 11 is placed in the third hole and the fourth hole. Tightening the locking screw 11 firmly connects the protective cover 4 and the telescopic connecting rod 10. The side of the protective cover 4 also includes a fifth hole 13. The fifth hole 13 connects to the middle of the third hole. The first locking screw 11 includes a sixth hole. The sixth hole and the fifth hole overlay. A second locking screw is placed in the sixth hole and the fifth hole. The second locking screw strengthens the first locking screw and more securely connects the protective cover 4 and the telescopic connecting rod 10. The top of the telescopic connecting rod 10 includes a stair shaped seventh hole, and the protective cover 4 includes a corresponding first blind hole. A locking pin 12 is placed in the seventh hole and the first blind hole to prevent the movement between the protective cover 4 and the telescopic connecting rod 10. The bottom of the protective cover 4 is connected to the top surface of the horizontally placed loading plate 5.

Working principles of universal loading station are as follows: Before starting 3D printing, the knob 2 is loosened so that the knob 2, the fixed connection sleeve 6, and the telescopic connecting ring 1 are in a relaxed state. The telescopic connecting ring 1 can move or swing around the hemispherical bottom of the ball screw 8 to a certain degree. The loading plate 5 can also move to a certain degree as being connected to the telescopic connecting ring 1. When the 3D printing starts, the drive motor of the 3D printer moves a lifting mechanism downward, and in turn moves the universal loading plate 5 downward. The loading plate 5 gradually moves close to a resin tank until the loading plate 5 contacts the surface of the resin in the resin tank and a pressure between the loading plate 5 and the resin surface is generated. Because of the pressure, the loading plate 5 tilts to a certain inclined angle so that the loading plate 5 is in full contact with the surface of the resin. After the loading plate 5 is in full and firm contact with the surface of the resin, the drive motor is shut down, and the first locking screw 11 and the knob 2 are tightened sequentially so that the knob 2, the fixed connection sleeve 6, and the telescopic connecting ring 1 are in a compressed state. Because the knob 2, the fixed connection sleeve 6, and the telescopic connecting ring 1 are in a compressed state, the inclined angle of the loading plate 5 is fixed. With the number of 3D printing layers increase, the drive motor move the lifting mechanism upward in real time, and the bottom of the loading plate 5 is always pressed against the surface of the resin in the resin tank.

The universal loading station of the present invention can automatically adjust the tilt angle of the loading plate 5 based on the pressure between the loading plate 5 and the surface of the resin in the resin tank. It ensures that the bottom of the loading plate 5 is full and firm contact. Tightening the locking screw 11 and the knob 2 locks the loading plate 5 at a certain tilt angle so that the bottom of loading plate 5 is always in full and firm contact with the surface of the resin in the whole 3D printing process. This eliminates the man power and time to manually adjust angle of the loading plate 5 in printing process. Further, a second locking screw strengthens the first locking screw 11, and prevents the movement between the protective cover 4 and the telescopic connecting rod 10. It also increases the stability of the loading plate 5. The universal loading station can be connected with a 3D printer lifting mechanism in various ways. It is easy to install and to adjust. Compared with existing technology, the universal loading station has a simple structure and easy to operate, and improves 3D printing quality.

Various embodiments described above are merely preferred embodiments of the present invention. The scope of the invention shall not be limited by these embodiment. Without departing from the spirit of the design of the present invention, the modifications and variations of this invention made by those of ordinary skill in the art fall within the scope of the appended claims and their equivalents.

What is claimed is:

1. A universal loading station for a laser 3D printer comprising:

a knob (2), a ball screw (8), a telescopic connecting ring (1), a telescopic connecting rod (10), and a loading plate (5), wherein the top of the ball screw ball screw (8) and the bottom of the knob (2) are connected by a threaded connection, the ball screw (8) is below the knob (2) and includes an outer sleeve which includes a spring (9), a fixed connection sleeve (6) surrounds the outer sleeve of the spring (9), a connecting arm (3) is connected to a side of the fixed connection sleeve (6), the bottom of the ball screw (8) is connected to the telescopic connecting ring (1), the bottom of the telescopic connecting ring (1) includes a first hemispherical recess, and the center of the first hemispherical recess includes a first hole, the telescopic connecting ring (1) is placed onto the ball screw (8) through the first hole, the bottom of the ball screw (8) has a hemispherical structure that matches the inner wall of the first hemispherical recess, there is space between the inner wall of the first hole and the ball screw (8), the telescopic connecting ring (1) is connected to the top of the telescopic connecting rod (10), and the bottom of the telescopic connecting rod (10) is connected to the top surface of the loading plate (5).

2. The universal loading station according to claim 1, further comprising a top plate (20), wherein the top plate (20) is provided on the top of the fixed connection sleeve (6), the top of the fixed connection sleeve (6) and the top plate (20) are connected by screws at the edge of the top plate (20), the top plate (20) includes a ninth hole in the center thereof, and the top plate (20) is placed onto the ball screw (8) through the ninth hole.

3. The universal loading station according to claim 1, further comprising a protective cover (4), wherein the protective cover (4) is located between the telescopic connecting rod (10) and the loading plate (5), the protective cover (4) includes a second hole in the center thereof, the bottom of the telescopic connecting rod (10) is placed through the second hole, the side of the protective cover (4) and the side of the telescopic connecting rod (10) include a third hole and a fourth hole, respectively, the third hole and fourth hole overlay, a first locking screw (11) is placed in the third hole and the fourth hole, the side of the protective cover (4) includes a fifth hole (13), the fifth hole (13) connects to the middle of the third hole, the first locking screw (11) includes a sixth hole, the sixth hole and the fifth hole (13) overlay, a second locking screw is placed in the sixth hole and the fifth hole, a second locking screw is placed in the fifth hole (13) and the sixth hole, and a locking pin (12) connects the protective cover (4) and the telescopic connecting rod (10).

4. The universal loading station according to claim 3, wherein the top of the telescopic connecting rod (10) includes a stair shaped seventh hole, the protective cover (4) includes a corresponding first blind hole, and the locking pin (12) is placed in the seventh hole and the first blind hole.

5. The universal loading station according to claim 1, wherein the loading plate (5) is in a horizontal direction.

\* \* \* \* \*